UNITED STATES PATENT OFFICE.

D. B. TOOLY, OF ALBION, NEW YORK.

IMPROVEMENT IN CEMENT.

Specification forming part of Letters Patent No. 68,671, dated September 10, 1867.

*To all whom it may concern:*

Be it known that I, D. B. TOOLY, of Albion, in the county of Orleans and State of New York, have invented a new and Improved Cement; and I do hereby declare that the following is a full, clear, and exact description thereof.

It is composed of the following ingredients, viz: White glue, water, gum-shellac, alcohol, aqua-ammonia, plaster-of-paris, white lead, and gum-arabic, in the following manner and proportions: Dissolve two pounds of white glue in three pints of water. To this add one ounce of shellac dissolved in one pint of alcohol, one ounce of aqua-ammonia, two ounces of plaster-of-paris previously moistened with water, one pound of white lead, and one-fourth ounce of gum-arabic, all to be thoroughly mixed together.

What I claim as my invention, and desire to secure by Letters Patent, is—

A cement composed of the ingredients above mentioned, in about the proportions set forth.

D. B. TOOLY.

Witnesses:
   W. H. HANSON,
   GEO. M. HOPKINS.